United States Patent
Nakamura et al.

(10) Patent No.: US 10,615,682 B2
(45) Date of Patent: Apr. 7, 2020

(54) ELECTRICALLY DRIVEN VEHICLE INVERTER DEVICE

(71) Applicant: AISIN AW CO., LTD., Anjo-shi, Aichi-ken (JP)

(72) Inventors: Yasushi Nakamura, Nishio (JP); Tomoya Hirano, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 124 days.

(21) Appl. No.: 15/743,181

(22) PCT Filed: Sep. 15, 2016

(86) PCT No.: PCT/JP2016/077271
§ 371 (c)(1),
(2) Date: Jan. 9, 2018

(87) PCT Pub. No.: WO2017/047696
PCT Pub. Date: Mar. 23, 2017

(65) Prior Publication Data
US 2019/0123635 A1    Apr. 25, 2019

(30) Foreign Application Priority Data
Sep. 18, 2015    (JP) .................. 2015-185689

(51) Int. Cl.
*H02M 1/32* (2007.01)
*B60L 58/10* (2019.01)
(Continued)

(52) U.S. Cl.
CPC ............. *H02M 1/32* (2013.01); *B60L 58/10* (2019.02); *H02M 1/08* (2013.01); *H02M 7/48* (2013.01);
(Continued)

(58) Field of Classification Search
CPC ................ H02M 2001/322; H02M 21/08; H02H 9/046; H02P 27/06; H05B 33/0845
See application file for complete search history.

(56) References Cited

U.S. PATENT DOCUMENTS

| 4,692,643 A | 9/1987 | Tokunaga et al. |
| 2010/0090529 A1* | 4/2010 | Yoshida ................ H02J 7/0068 307/31 |

(Continued)

FOREIGN PATENT DOCUMENTS

| JP | S57-203677 U | 12/1982 |
| JP | S60-93820 A | 5/1985 |

(Continued)

OTHER PUBLICATIONS

Oct. 25, 2016 Search Report issued in International Patent Application No. PCT/JP2016/077271.

*Primary Examiner* — Elvin G Enad
*Assistant Examiner* — Zoheb S Imtiaz
(74) *Attorney, Agent, or Firm* — Oliff PLC (57) ABSTRACT

An electrically driven vehicle inverter device includes a smoothing capacitor, a discharge resistor, a discharge resistor and first and second discharge switching elements connected in series between both ends of the smoothing capacitor, and a clamp circuit provided for at least one of the first and second discharge switching elements. The clamp circuit includes a reverse flow prevention element and a constant voltage generation element that causes a constant voltage drop when a voltage across the constant voltage generation element exceeds a value determined in advance, for example.

20 Claims, 7 Drawing Sheets

(51) Int. Cl.
  *H02M 7/48* (2007.01)
  *H02M 1/08* (2006.01)
  *H02M 7/5387* (2007.01)
  *H02P 27/06* (2006.01)

(52) U.S. Cl.
  CPC .......... *H02M 7/5387* (2013.01); *H02P 27/06* (2013.01); *B60L 2240/547* (2013.01); *B60Y 2200/91* (2013.01); *H02M 2001/322* (2013.01)

(56) References Cited

U.S. PATENT DOCUMENTS

| | | | | |
|---|---|---|---|---|
| 2011/0031939 | A1* | 2/2011 | Funaba | B60K 6/445 320/166 |
| 2012/0217849 | A1* | 8/2012 | Aoki | H02P 6/18 310/68 D |
| 2012/0262951 | A1* | 10/2012 | Suenaga | H05B 6/666 363/16 |
| 2013/0234510 | A1 | 9/2013 | Nakamura | |
| 2014/0167722 | A1* | 6/2014 | Lee | H02M 1/38 323/282 |
| 2015/0097426 | A1 | 4/2015 | Yamane et al. | |
| 2015/0326156 | A1* | 11/2015 | Kanzaki | H02M 1/32 318/400.21 |
| 2017/0098963 | A1* | 4/2017 | Takahashi | H02M 7/537 |

FOREIGN PATENT DOCUMENTS

| | | |
|---|---|---|
| JP | 2011-041363 A | 2/2011 |
| JP | 2011-244518 A | 12/2011 |
| JP | 2013-188092 A | 9/2013 |
| JP | 2015-073410 A | 4/2015 |
| WO | 2011/077744 A1 | 6/2011 |

\* cited by examiner

ELECTRICALLY DRIVEN VEHICLE INVERTER DEVICE

TECHNICAL FIELD

The present disclosure relates to an electrically driven vehicle inverter device.

BACKGROUND ART

There is known an electrically driven vehicle inverter device in which a single switching element electrically connected in parallel with a smoothing capacitor is turned on to release a charge accumulated in the smoothing capacitor to a ground (see Patent Document 1, for example).

RELATED-ART DOCUMENTS

Patent Documents

Patent Document 1: Japanese Patent Application Publication No. 2013-188092 (JP 2013-188092 A)

SUMMARY

Problem to be Solved

With the electrically driven vehicle inverter device in which a single switching element is used as described in Patent Document 1 mentioned above, however, the voltage across the smoothing capacitor cannot be made higher than the withstanding voltage of the switching element, and therefore it is difficult to support a higher voltage across the smoothing capacitor that accompanies a rise in the rotational speed of a motor. That is, in order to support a higher voltage, it is necessary to raise the withstanding voltage of the switching element, which incurs an increase in cost, an increase in physical dimensions (size), and an increase in conduction loss.

In the light of the above, it is conceivable to connect a plurality of switching elements, which are connected in series with each other, in parallel with a smoothing capacitor in order to enable a higher voltage across the smoothing capacitor without raising the withstanding voltage of the switching elements. With such a method, however, unbalanced voltages may be applied to the plurality of switching elements if there is an individual difference (e.g. a difference in the threshold voltage at which the switching elements are turned on) between the plurality of switching elements. In this case, a voltage that is equal to or more than the withstanding voltage may be applied to the switching element in the upper stage when the switching element in the lower stage is turned on earlier than the switching element in the upper stage, for example.

In view of this respect, it is also possible to measure the individual difference between two switching elements in advance at the time of manufacture and add a clamp circuit to the side of a switching element that is turned on later. However, such a method requires trouble (man-hours) to measure the individual difference.

In view of the foregoing, it is an object of the present disclosure to provide an electrically driven vehicle inverter device in which a plurality of switching elements connected in series with each other are connected in parallel with a smoothing capacitor and which can reduce the possibility of application of a voltage that is equal to or more than the withstanding voltage to the switching elements.

According to the present disclosure, an electrically driven vehicle inverter device in which a plurality of switching elements are electrically connected in parallel with a smoothing capacitor and which can reduce the possibility of application of a voltage that is equal to or more than the withstanding voltage to the switching elements can be obtained.

BEST MODE

Embodiments will be described in detail below with reference to the accompanying drawings.

In the following description, unless otherwise mentioned, the term "connection" between various elements means "electrical connection".

Figure 1:
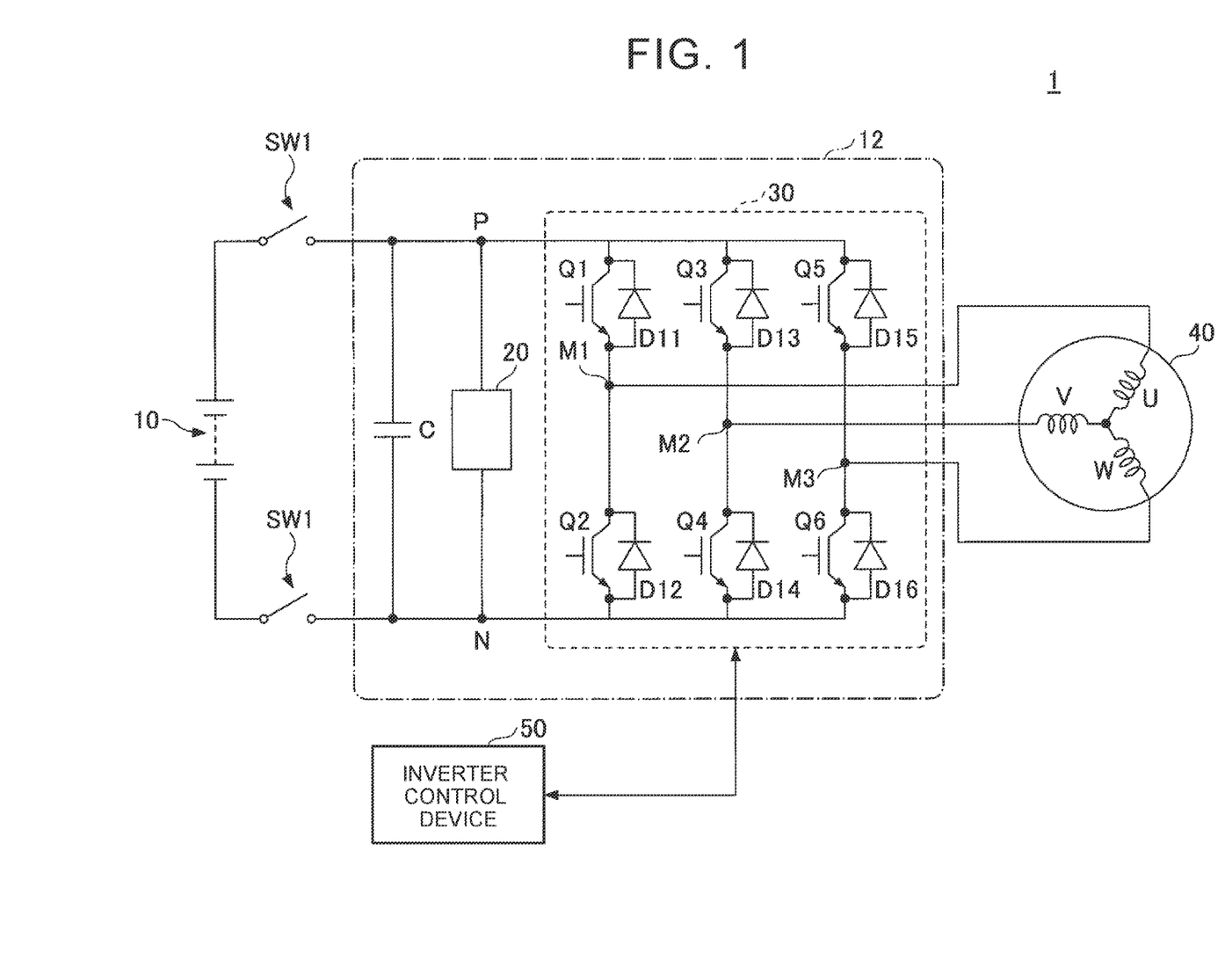
FIG. 1 illustrates an example of the overall configuration of an electrically driven vehicle motor drive system.

FIG. 1 illustrates an example of the overall configuration of an electrically driven vehicle motor drive system 1. The motor drive system 1 is a system that drives a vehicle by driving a travel motor 40 using electric power of a high-voltage battery 10. The details of the type and the configuration of the electrically driven vehicle may be determined as desired as long as the electrically driven vehicle travels by driving the travel motor 40 using electric power. Typical examples of the electrically driven vehicle include hybrid vehicles having an engine and the travel motor 40 as power sources and electric vehicles having only the travel motor 40 as a power source.

As illustrated in FIG. 1, the motor drive system 1 includes the high-voltage battery 10, an electrically driven vehicle inverter device 12, the travel motor 40, and an inverter control device 50.

The high-voltage battery 10 may be any electricity accumulation device that accumulates electric power to output a DC voltage, and may include a nickel-hydrogen battery, a lithium-ion battery, or a capacitive element such as an electric double-layer capacitor. The high-voltage battery 10 is typically a battery with a rated voltage exceeding 100 V. The rated voltage is 288 V, for example.

The electrically driven vehicle inverter device 12 includes a smoothing capacitor C, a discharge circuit 20, and an inverter 30.

The smoothing capacitor C is connected in parallel with the inverter 30.

The discharge circuit 20 has a function of releasing (discharging) a charge accumulated in the smoothing capacitor C to the ground in the case where a discharge command is input. The discharge command is typically input when a collision of the vehicle is detected or when it is determined that a collision of the vehicle is unavoidable. The discharge command may be supplied from an air bag ECU that controls a safety device (e.g. an air bag) of the vehicle, a pre-crash ECU (not illustrated), or the like. The discharge circuit 20 will be further described later.

The inverter 30 is constituted from arms for U-phase, V-phase, and W-phase disposed in parallel with each other between a positive electrode line and a negative electrode line. The U-phase arm is formed from a series connection of switching elements (in the example, IGBTs (Insulated Gate Bipolar Transistors)) Q1 and Q2. The V-phase arm is formed from a series connection of switching elements (in the example, IGBTs) Q3 and Q4. The W-phase arm is formed from a series connection of switching elements (in the example, IGBTs) Q5 and Q6. Diodes D11 to D16 are disposed between the collector and the emitter of the switching elements Q1 to Q6, respectively, to allow a current to flow from the emitter side to the collector side. The switching elements Q1 to Q6 may be switching elements other than IGBTs such as MOSFETs (metal oxide semiconductor field-effect transistors).

The travel motor 40 is a three-phase AC motor with first ends of three coils for U-phase, V-phase, and W-phase connected to a common middle point. The second end of the U-phase coil is connected to a middle point M1 between the switching elements Q1 and Q2. The second end of the V-phase coil is connected to a middle point M2 between the switching elements Q3 and Q4. The second end of the W-phase coil is connected to a middle point M3 between the switching elements Q5 and Q6. The smoothing capacitor C is connected between the collector of the switching element Q1 and the negative electrode line.

The inverter control device 50 controls the inverter 30. The inverter control device 50 includes a CPU, a ROM, and a main memory (any of which is not illustrated), for example. Various functions of the inverter control device 50 are achieved by the main memory reading a control program stored in the ROM etc. and the CPU executing the control program. The inverter 30 may be controlled as desired. Basically, the two switching elements Q1 and Q2 for U-phase are turned on and off in opposite phase. The two switching elements Q3 and Q4 for V-phase are turned on and off in opposite phase. The two switching elements Q5 and Q6 for W-phase are turned on and off in opposite phase.

In the example illustrated in FIG. 1, the motor drive system 1 includes a single travel motor 40. However, the motor drive system 1 may include an additional motor (including an electric generator). In this case, the additional motor (or motors) may be connected to the high-voltage battery 10 together with a corresponding inverter (or inverters) in parallel with the travel motor 40 and the inverter 30. In the example illustrated in FIG. 1, in addition, the motor drive system 1 does not include a DC/DC converter. However, a DC/DC converter may be provided between the high-voltage battery 10 and the inverter 30.

As illustrated in FIG. 1, a cut-off switch SW1 is provided between the high-voltage battery 10 and the smoothing capacitor C to cut off supply of electric power from the high-voltage battery 10. The cut-off switch SW1 may be constituted from a semiconductor switch, a relay, etc. The cut-off switch SW1 is normally turned on, and turned off when a collision of the vehicle is detected, for example. On/off switching of the cut-off switch SW1 may be achieved by the inverter control device 50, or may be achieved by another control device.

The motor drive system 1 further includes the discharge circuit 20. As illustrated in FIG. 1, the discharge circuit 20 is connected in parallel with the smoothing capacitor C. In the example illustrated in FIG. 1, the discharge circuit 20 is disposed between the smoothing capacitor C and the inverter 30. However, it is only necessary that the discharge circuit 20 should be disposed on the smoothing capacitor C side with respect to the cut-off switch SW1. Thus, the discharge circuit 20 may be disposed between the high-voltage battery 10 (and the cut-off switch SW1) and the smoothing capacitor C.

First Embodiment

Next, an electrically driven vehicle inverter device according to an embodiment (first embodiment) that can be applied to the electrically driven vehicle motor drive system 1 illustrated in FIG. 1 will be described.

Figure 2:
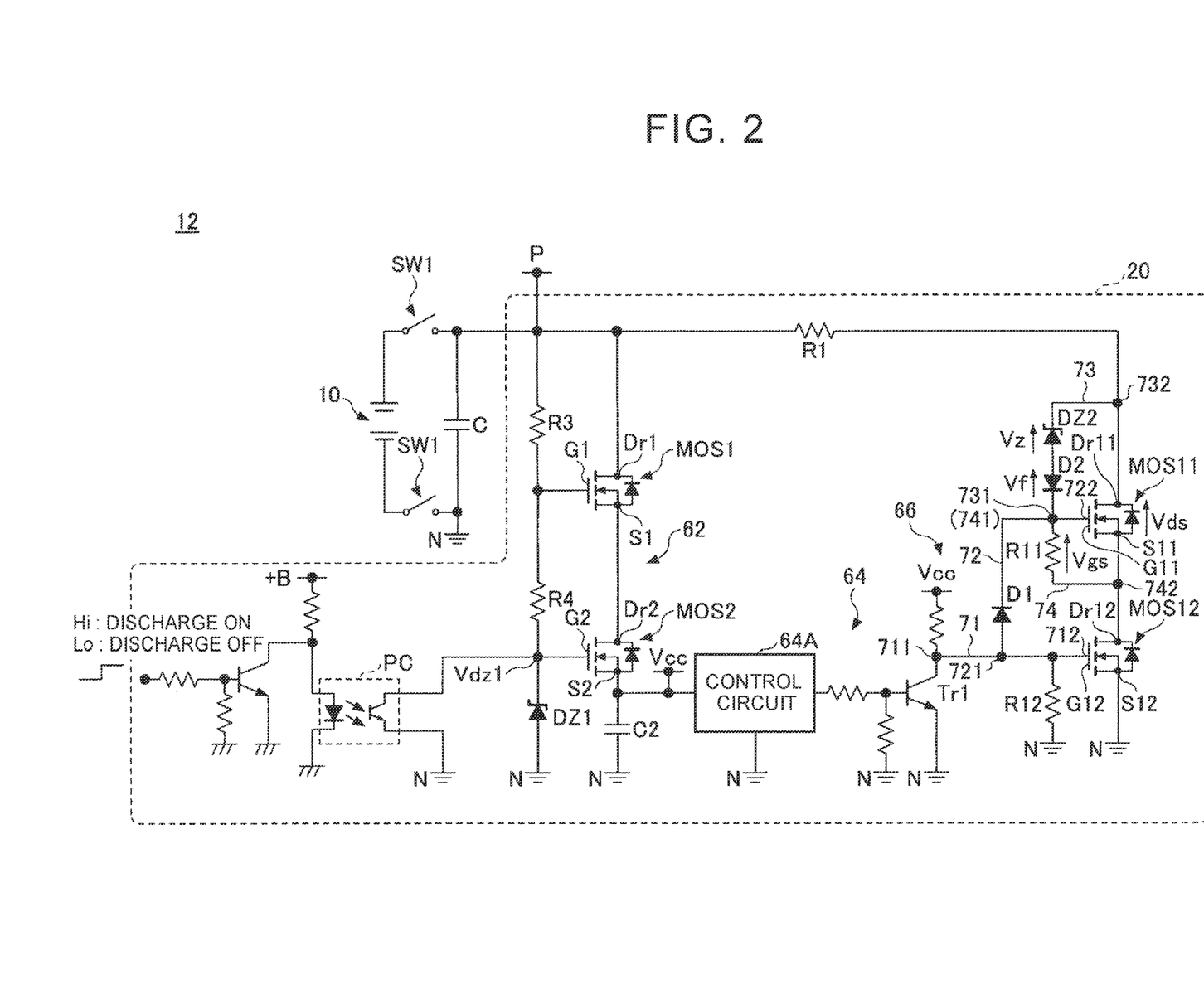
FIG. 2 illustrates an electrically driven vehicle inverter device according to an embodiment (first embodiment).

FIG. 2 illustrates the electrically driven vehicle inverter device 12 according to the first embodiment. In FIG. 2, the high-voltage battery 10 and the cut-off switch SW1 are illustrated in addition to the electrically driven vehicle inverter device 12. In FIG. 2, a point P represents a point at the same potential as a terminal of the smoothing capacitor C on the positive electrode side, and corresponds to a point P in FIG. 1. N denotes a point at the same potential (ground potential) as a terminal of the smoothing capacitor C on the negative electrode side, and corresponds to a point N in FIG. 1.

The discharge circuit 20 includes a discharge resistor R1, a power source circuit 62, an abnormality detection circuit 64, and a discharge control circuit 66.

One end of the discharge resistor R1 is connected to the positive electrode side of the smoothing capacitor C, and the other end of the discharge resistor R1 is connected to the ground.

The power source circuit 62 has a function of generating a power source voltage Vcc to be supplied to the abnormality detection circuit 64 and the discharge control circuit 66. The power source circuit 62 generates the power source voltage Vcc which is a constant voltage (e.g. +15 V) by use of the voltage of the smoothing capacitor C (discharge from the smoothing capacitor C). The power source circuit 62 is connected in parallel with the smoothing capacitor C.

The power source circuit 62 includes a photocoupler PC, a switching element MOS1 which is a MOSFET, a switching element MOS2 which is a MOSFET, a Zener diode DZ1, and resistors R3 and R4.

The switching element MOS1, the switching element MOS2, and a capacitor C2 are connected in series with each other. A drain Dr1 of the switching element MOS1 is connected to the positive electrode side of the smoothing capacitor C. A source S1 of the switching element MOS1 is connected to a drain Dr2 of the switching element MOS2. A source S2 of the switching element MOS2 is connected to the ground via the capacitor C2. In this way, the switching element MOS1, the switching element MOS2, and the capacitor C2, which are connected in series with each other, are connected in parallel with the smoothing capacitor C.

The resistors R3 and R4 and the Zener diode DZ1 are connected in series with each other. The resistors R3 and R4 and the Zener diode DZ1, which are connected in series with each other, are connected in parallel with the smoothing capacitor C, separately from the switching element MOS1, the switching element MOS2, and the capacitor C2, which are also connected in series with each other. A gate G1 of the switching element MOS1 is connected between the resistor R3 and the resistor R4. A gate G2 of the switching element MOS2 is connected between the resistor R4 and the Zener diode DZ1. The Zener diode DZ1 is connected between the gate G2 of the switching element MOS2 and the ground in such an orientation that the cathode is connected to the gate G2 of the switching element MOS2.

A discharge command is input to the power source circuit 62. In the illustrated example, the discharge command is input to the power source circuit 62 via the photocoupler PC. The discharge command is a pulse signal, with "Hi" corresponding to a discharge ON command and "Lo" corresponding to a discharge OFF command, for example. When the discharge command is input, a phototransistor of the photocoupler PC is turned on. When the phototransistor is turned on, a constant voltage Vdz1 is applied to the gate G2 of the switching element MOS2 by the Zener diode DZ1, and a constant voltage divided by the resistors R3 and R4 is applied to the gate G1 of the switching element MOS1. A voltage obtained by subtracting the voltage Vdz1 from the voltage on the positive electrode side of the smoothing capacitor C and dividing the resulting voltage by the resistors R3 and R4 is applied to the gate G1 of the switching element MOS1. In this event, the switching element MOS1 and the switching element MOS2 operate as linear regulators. Consequently, the power source voltage Vcc which is a constant voltage is generated. As illustrated in FIG. 2, the power source voltage Vcc is used by the abnormality detection circuit 64 and the discharge control circuit 66.

The abnormality detection circuit 64 has a function of preventing abnormally long continuation of discharge due to an abnormality of the cut-off switch SW1 etc., for example. The abnormality detection circuit 64 includes a control circuit 64A and a transistor Tr1. When a discharge command is input, the power source voltage Vcc is applied to the abnormality detection circuit 64 as discussed above. The control circuit 64A of the abnormality detection circuit 64 forcibly turns on the transistor Tr1 when a predetermined condition is met after the start of discharge. For example, the control circuit 64A of the abnormality detection circuit 64 turns on the transistor Tr1 in the case where the power source voltage Vcc is still applied after the lapse of a certain time ΔT1 after the start of application of the power source voltage Vcc. This is because it is assumed that the cut-off switch SW1 may be closed even when a discharge command is generated because of some abnormality (such as a case where the cut-off switch SW1 is fixed in the on state, for example). The certain time ΔT1 corresponds to the upper-limit value of the time for which discharge can be continued, and may be an adapted value adapted on the basis of a test or the like.

The discharge control circuit 66 has a function of releasing (discharging) a charge accumulated in the smoothing capacitor C to the ground via the discharge resistor R1. The discharge control circuit 66 operates on the power source voltage Vcc which is generated by the power source circuit 62 as discussed above.

The discharge control circuit 66 includes a first discharge switching element MOS11, a second discharge switching element MOS12, a first wire 71, a second wire 72, a third wire 73, a fourth wire 74, a Zener diode DZ2 (an example of the first constant voltage generation element), diodes D1 and D2, and resistors R11 and R12.

The first discharge switching element MOS11 and the second discharge switching element MOS12 are connected in series with the discharge resistor R1. Specifically, a drain Dr11 of the first discharge switching element MOS11 is connected to the discharge resistor R1, and a source S11 of the first discharge switching element MOS11 is connected to a drain Dr12 of the second discharge switching element MOS12. A source S12 of the second discharge switching element MOS12 is connected to the ground.

One end (see a connection point 711) of the first wire 71 is connected to an input terminal (an example of the power feed portion) of the power source voltage Vcc, and the other end (see a connection point 712) of the first wire 71 is connected to a gate G12 of the second discharge switching element MOS12. The connection point 711 of the first wire 71 is provided between the collector of the transistor Tr1 and the input terminal of the power source voltage Vcc. Thus, in the case where the transistor Tr1 is turned off while the power source voltage Vcc is generated, a voltage corresponding to the power source voltage Vcc (a voltage that is lower by an amount corresponding to a voltage drop due to the resistor 21) is applied to the connection point 711 of the first wire 71. In the case where the transistor Tr1 is turned on while the power source voltage Vcc is generated, on the other hand, the connection point 711 of the first wire 71 is substantially at the ground potential. The other end of the resistor R12, one end of which is connected to the ground, is connected to a point on the first wire 71 between a connection point 721 with the second wire 72 and the gate G12 of the second discharge switching element MOS12. The resistor R12 is provided to charge the gate G12 of the second discharge switching element MOS12.

One end (see the connection point 721) of the second wire 72 is connected to a point on the first wire 71 between the connection point 711 and the gate G12 of the second discharge switching element MOS12, and the other end (see a connection point 722) of the second wire 72 is connected to the gate of the first discharge switching element. The potential of one end (see the connection point 721) of the second wire 72 is the same as the potential of the connection point 711 of the first wire 71.

The second wire 72 is provided with the diode D1. The diode D1 hinders a flow of a current in the direction opposite to the direction toward a gate G11 of the first discharge switching element MOS11.

One end (see a connection point 731) of the third wire 73 is connected to a point on the second wire 72 between the diode D1 and the gate G12 of the second discharge switching element MOS12, and the other end (see a connection point 732) of the third wire 73 is connected between the drain Dr11 of the first discharge switching element MOS11 and the discharge resistor R1.

The third wire 73 is provided with the Zener diode DZ2 and the diode D2. The Zener diode DZ2 is provided in such an orientation that the cathode is connected to the drain Dr11 of the first discharge switching element MOS11. The diode D2 is provided in such an orientation that the anode is connected to the anode of the Zener diode DZ2.

One end (see a connection point 741) of the fourth wire 74 is connected to a point on the second wire 72 between the diode D1 and the gate G12 of the second discharge switching element MOS12, and the other end (see a connection point 742) of the fourth wire 74 is connected between the source S11 of the first discharge switching element MOS11 and the drain Dr12 of the second discharge switching element MOS12.

The fourth wire 74 is provided with the resistor R11.

Here, the third wire 73, the Zener diode DZ2, and the diode D2 cooperate with the first discharge switching element MOS11 to function as a clamp circuit that restricts (clamps) a drain-source voltage Vds of the first discharge switching element MOS11 so as not to exceed a predetermined upper-limit value (clamp voltage). Specifically, when Vz and Vf are defined in the direction indicated in FIG. 2, a clamp voltage Vds_clamp is determined by the following formula.

$$Vds\_clamp = Vz + Vf + Vth \qquad \text{Formula (1)}$$

where Vth is a threshold voltage for the first discharge switching element MOS11.

In this way, with the electrically driven vehicle inverter device 12 illustrated in FIG. 2, the Zener diode DZ2 etc. functions as a clamp circuit as discussed above, and thus application of a voltage that exceeds the withstanding voltage to the first discharge switching element MOS11 can be prevented.

It is assumed that the potential on the positive electrode side of the smoothing capacitor C at the time of start of discharge is 1200 [V] and the withstanding voltage of the first discharge switching element MOS11 is 900 [V], for example. In this event, if it is assumed that Vz, Vf, and Vth in the formula (1) given above are 600 [V], 1 [V], and 4 [V], respectively, for example, the clamp voltage Vds_clamp is 605 [V]. By determining the values of Vz etc. in consideration of the value of the withstanding voltage of the first discharge switching element MOS11 in this way, the withstanding voltage of the discharge circuit 20 as a whole can be made higher without making the withstanding voltage of the first discharge switching element MOS11 higher than 1200 [V].

Next, operation (function) of the discharge control circuit 66 illustrated in FIG. 2 will be further described with reference to FIG. 3 etc.

Figure 3:
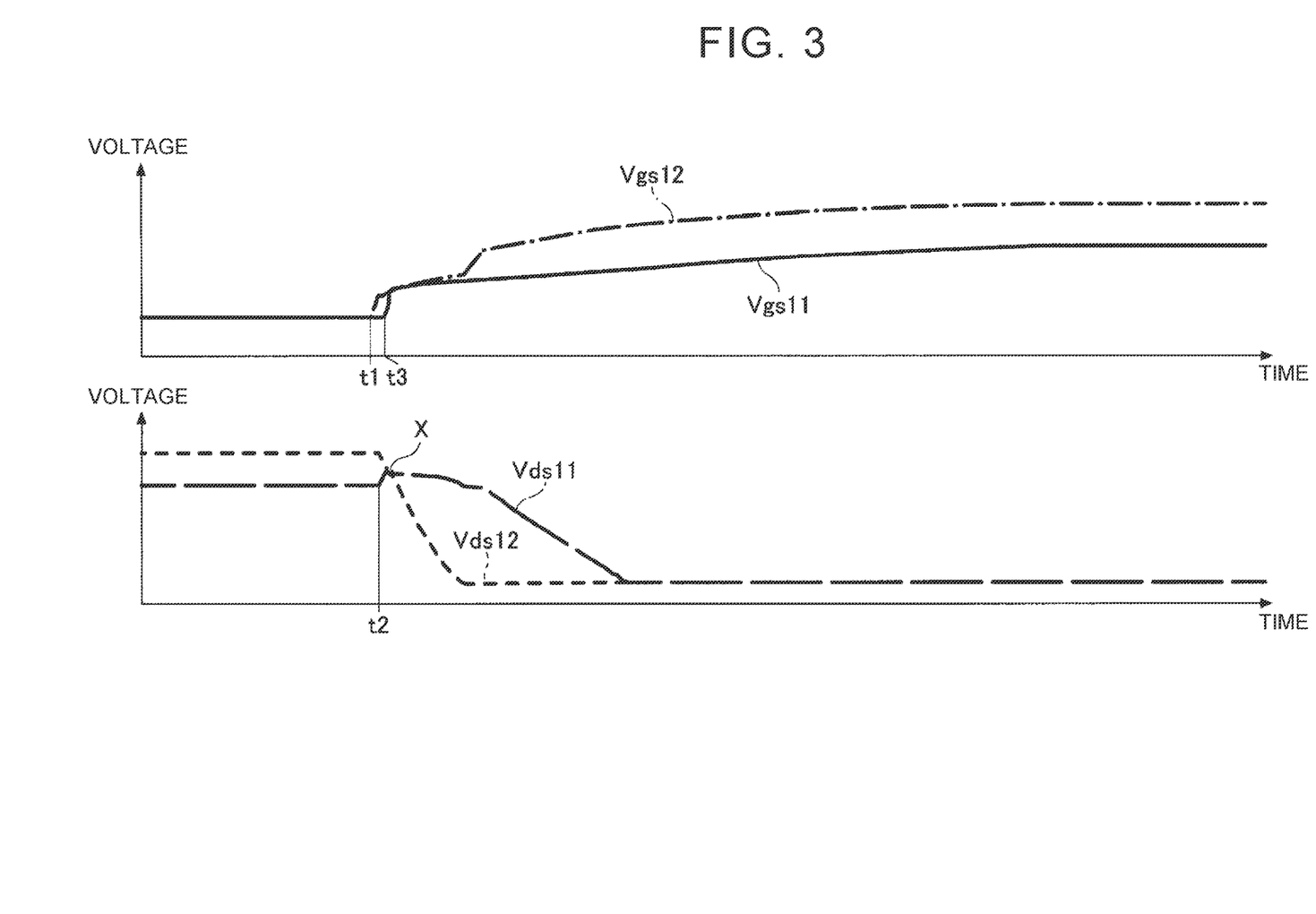
FIG. 3 illustrates an example of a voltage waveform achieved by a discharge control circuit according to the first embodiment.
Figure 4:
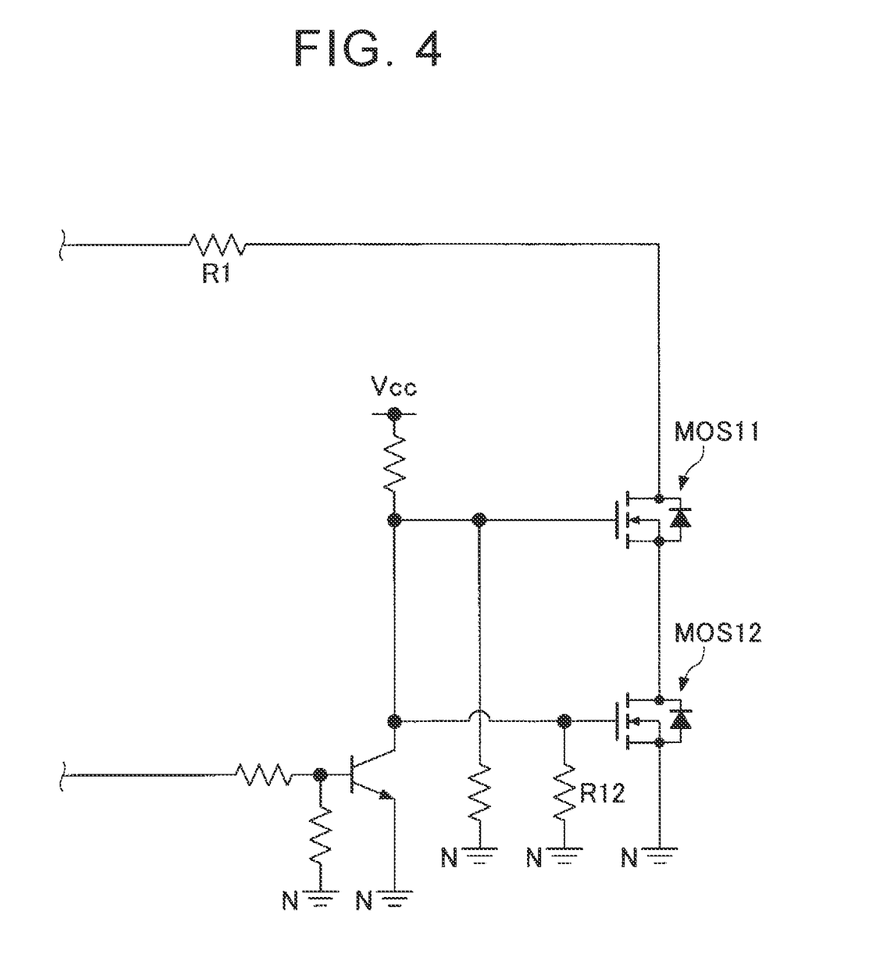
FIG. 4 illustrates a discharge control circuit according to a first comparative example.
Figure 5:
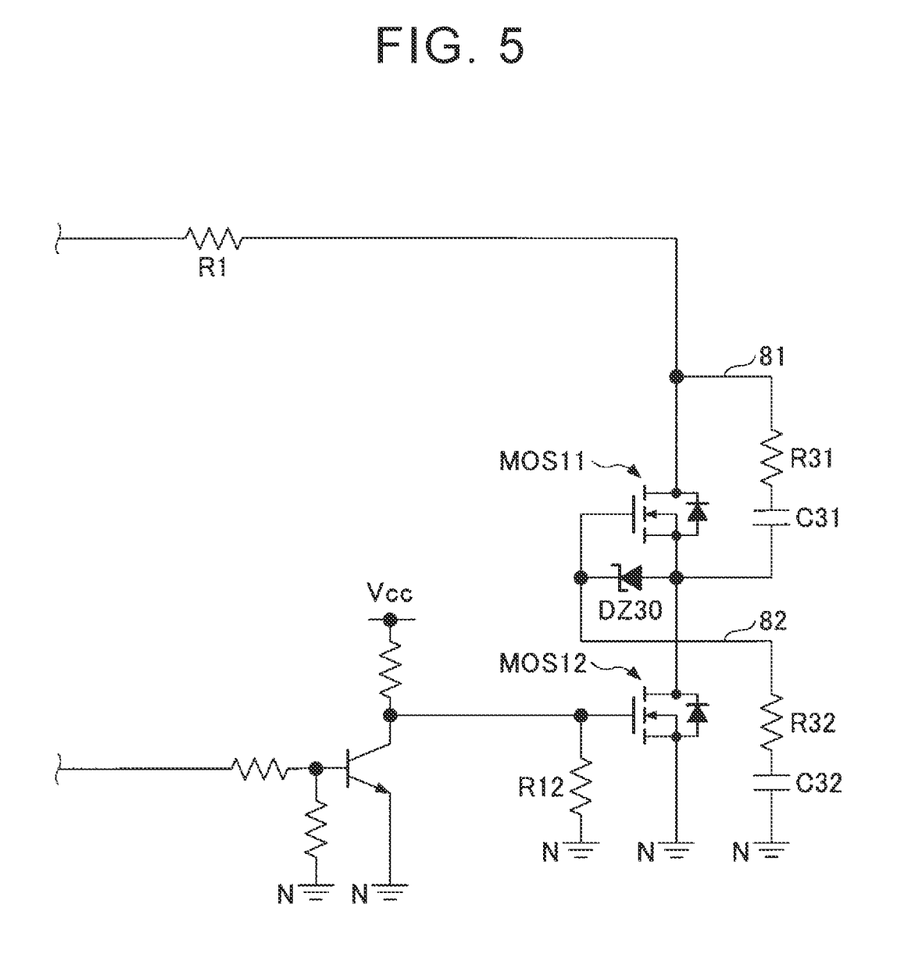
FIG. 5 illustrates a discharge control circuit according to a second comparative example.
Figure 6:
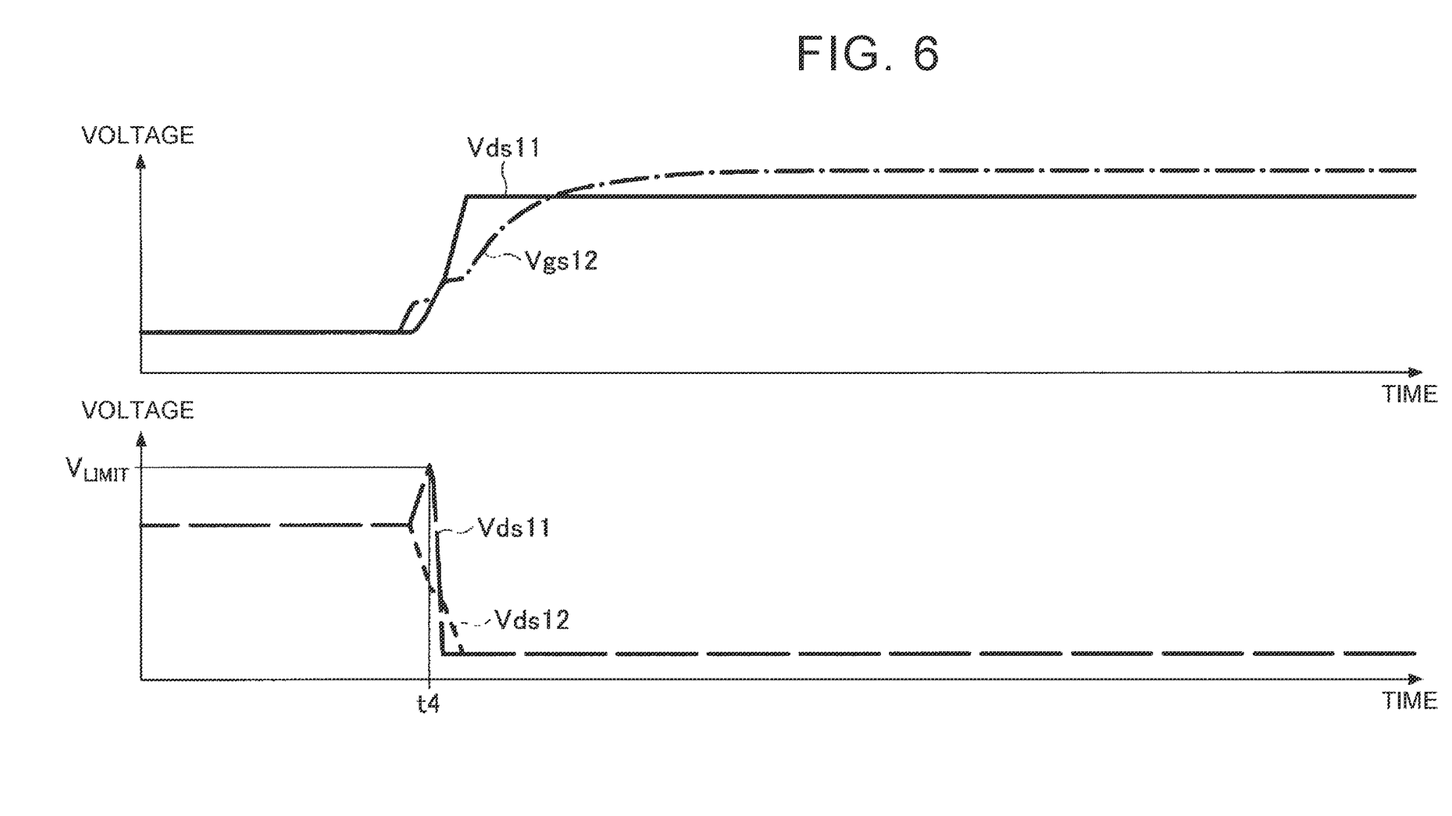
FIG. 6 illustrates an example of a voltage waveform achieved by the discharge control circuit according to the second embodiment.

FIG. 3 illustrates an example of a voltage waveform achieved by the discharge control circuit 66 according to the first embodiment. FIG. 4 illustrates a discharge control circuit according to a first comparative example. FIG. 5 illustrates a discharge control circuit according to a second comparative example. FIG. 6 illustrates an example of a voltage waveform achieved by the discharge control circuit according to the second embodiment.

In FIGS. 3 and 6, the upper graphs indicate respective voltage waveforms of a gate-source voltage Vgs11 of the first discharge switching element MOS11 and a gate-source voltage Vgs12 of the second discharge switching element MOS12, and the lower graphs indicate respective voltage waveforms of a drain-source voltage Vds11 of the first discharge switching element MOS11 and a drain-source voltage Vds12 of the second discharge switching element MOS12. The voltage waveforms in FIGS. 3 and 6 are on the same scale for comparison.

In the first comparative example, as illustrated in FIG. 4, the power source voltage Vcc is divided and applied to the respective gates of the first discharge switching element MOS11 and the second discharge switching element MOS12.

Here, it is assumed that there is an individual difference (in the threshold voltage) between the first discharge switching element MOS11 and the second discharge switching element MOS12, and that the threshold voltage of the first discharge switching element MOS11 is lower than that of the second discharge switching element MOS12. In this case, in the first comparative example, although not illustrated, when the power source voltage Vcc is raised along with input of a discharge command, the second discharge switching element MOS12 is turned on earlier than the first discharge switching element MOS11, and the drain-source voltage Vds11 of the first discharge switching element MOS11 is abruptly increased by the second discharge switching element MOS12 being turned on. In this event, the drain-source voltage Vds11 of the first discharge switching element MOS11 may exceed a withstanding voltage $V_{LIMIT}$ of the first discharge switching element MOS11.

In a second comparative example, as illustrated in FIG. 5, a Zener diode DZ30 is provided between the gate G11 and the source S11 of the first discharge switching element MOS11, a wire 81 from the drain Dr11 side of the first discharge switching element MOS11 (the wire 81 including a resistor R31 and a capacitor C31) is connected to the anode side of the Zener diode DZ30, and a wire 82 from the ground (the wire 82 including a resistor R32 and a capacitor C32) is connected to the cathode side of the Zener diode DZ30.

Similarly, it is assumed that there is an individual difference (in the threshold voltage) between the first discharge switching element MOS11 and the second discharge switching element MOS12, and that the threshold voltage of the first discharge switching element MOS11 is lower than that of the second discharge switching element MOS12. In this case, in the second comparative example, when the power source voltage Vcc is raised along with input of a discharge command, as illustrated in FIG. 6, the second discharge switching element MOS12 is turned on earlier than the first discharge switching element MOS11. In this event, the capacitor C32 starts discharge, along with which the drain-source voltage Vds11 of the first discharge switching element MOS11 is abruptly increased. Along with the abrupt increase, the drain-source voltage Vds11 of the first discharge switching element MOS11 may exceed the withstanding voltage $V_{LIMIT}$ of the first discharge switching element MOS11 (see time t4 in FIG. 6).

In the first embodiment, in contrast, when the power source voltage Vcc is raised along with input of a discharge command, first, the gate G12 of the second discharge switching element MOS12 is charged via the first wire 71 (see time t1 in FIG. 3), and the second discharge switching element MOS12 is turned on. This is because a flow of a current for charging the gate of the first discharge switching element MOS11 via the second wire 72 is not generated unless the second discharge switching element MOS12 is turned on. In this way, there is set a "time difference" with which the first discharge switching element MOS11 starts being turned on after the second discharge switching element MOS12 is turned on. The same applies to the case where there is an individual difference (in the threshold voltage) between the first discharge switching element MOS11 and the second discharge switching element MOS12, and where the threshold voltage of the first discharge switching element MOS11 is higher than that of the second discharge switching element MOS12.

In the first embodiment, when the second discharge switching element MOS12 is turned on, the drain-source voltage Vds11 of the first discharge switching element MOS11 is increased (see time t2 in FIG. 3) by the second discharge switching element MOS12 being turned on. In this event, however, the clamp circuit discussed above functions, and the drain-source voltage Vds11 of the first discharge switching element MOS11 does not exceed the clamp voltage Vds_clamp (see a point X in FIG. 3). In this way, with the first embodiment, the first discharge switching element MOS11 can be protected at the time of start of discharge.

In the first embodiment, when the second discharge switching element MOS12 is turned on, a flow of a current for charging the gate of the first discharge switching element MOS11 via the second wire 72 (a flow of a current toward the ground via the connection points 711, 721, 731, and 742 and the second discharge switching element MOS12) is generated, and the gate of the first discharge switching element MOS11 starts being charged (see time t3 in FIG. 3). Along with the start of charge, the drain-source voltage Vds11 of the first discharge switching element MOS11 is decreased without exceeding the clamp voltage Vds_clamp. Finally, the first discharge switching element MOS11 is completely turned on, which promotes discharge via the discharge resistor R1.

In the first embodiment, although not illustrated, when discharge progresses as discussed above, the potential on the positive electrode side of the smoothing capacitor C is reduced (the potential on the positive electrode side of the smoothing capacitor C at the start of discharge is 1200 [V], for example). Discharge is continued until the potential on the positive electrode side of the smoothing capacitor C becomes sufficiently low (e.g. 30 [V]). When the potential on the positive electrode side of the smoothing capacitor C becomes further low enough not to allow generation of the power source voltage Vcc thereafter, the respective gate-source voltages of the first discharge switching element MOS11 and the second discharge switching element MOS12 are lowered, and both the first discharge switching element MOS11 and the second discharge switching element MOS12 are turned off (that is, discharge is completed).

Second Embodiment

Next, an electrically driven vehicle inverter device according to another embodiment (second embodiment) that can be applied to the electrically driven vehicle motor drive system 1 illustrated in FIG. 1 will be described.

Figure 7:
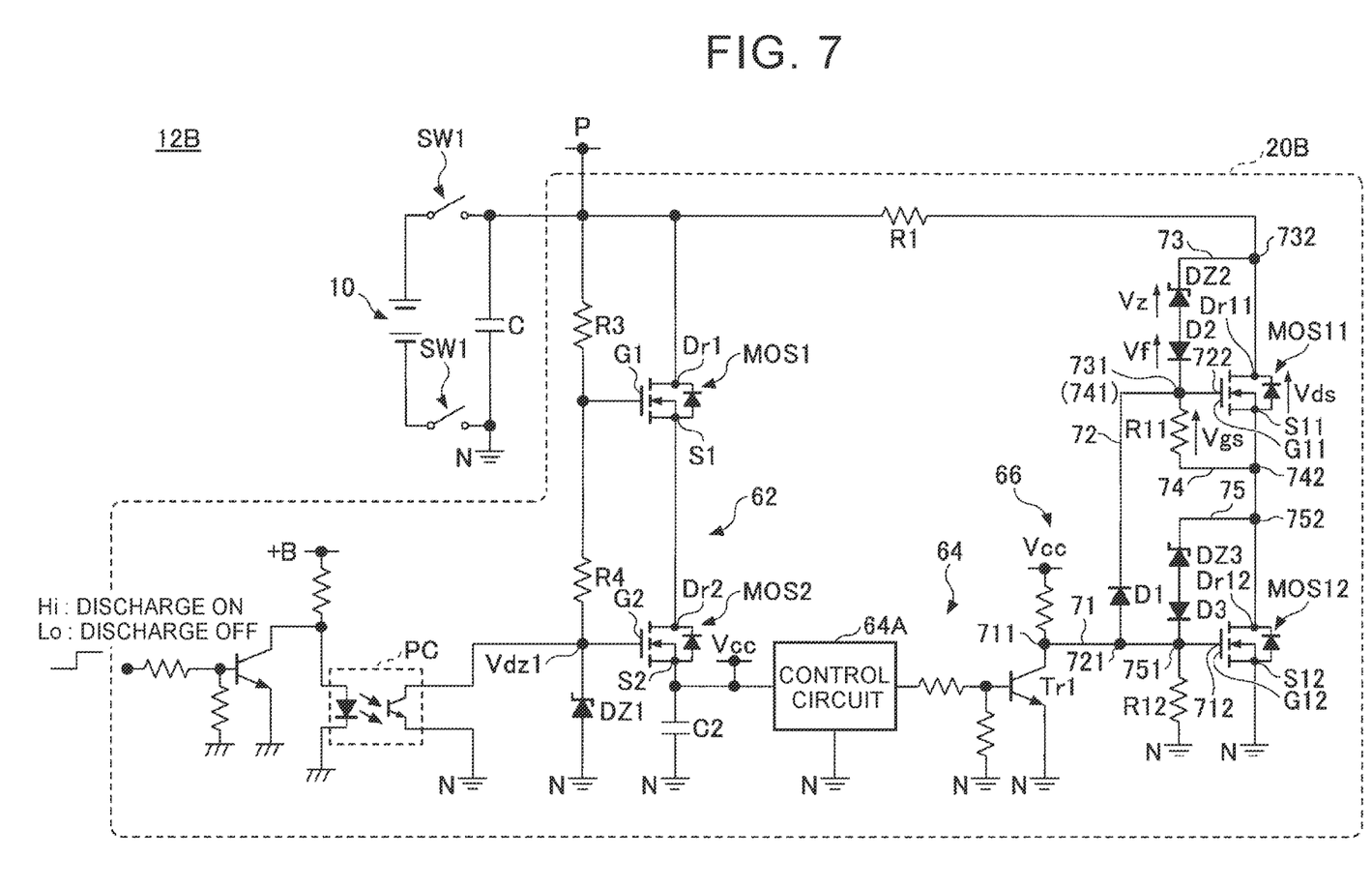
FIG. 7 illustrates an electrically driven vehicle inverter device according to another embodiment (second embodiment).

FIG. 7 illustrates an electrically driven vehicle inverter device 12B according to the second embodiment. In FIG. 7, the high-voltage battery 10 and the cut-off switch SW1 are illustrated in addition to the electrically driven vehicle inverter device 12B. In FIG. 7, a point P represents a point at the same potential as a terminal of the smoothing capacitor C on the positive electrode side, and corresponds to the point P in FIG. 1. N denotes a point at the same potential (ground potential) as a terminal of the smoothing capacitor C on the negative electrode side, and corresponds to the point N in FIG. 1.

The electrically driven vehicle inverter device 12B according to the second embodiment is different from the electrically driven vehicle inverter device 12 according to the first embodiment discussed above in that the discharge circuit 20 is replaced with a discharge circuit 20B as illustrated in FIG. 7. The discharge circuit 20B is different from the discharge circuit 20 according to the first embodiment discussed above in that a fifth wire 75, a Zener diode DZ3 (an example of the second constant voltage generation element), and a diode D3 have been added. In FIG. 7, components that are the same as those of the electrically driven vehicle inverter device 12 according to the first embodiment discussed above are given the same reference numerals to omit description.

One end (see a connection point 751) of the fifth wire 75 is connected to a point on the first wire 71 between the connection point 721 of the second wire 72 and the gate G12 of the second discharge switching element MOS12, and the other end (see a connection point 752) of the fifth wire 75 is connected between the connection point 742 of the fourth wire 74 and the drain Dr12 of the second discharge switching element MOS12.

The fifth wire 75 is provided with the Zener diode DZ3 and the diode D3. The Zener diode DZ3 is provided in such an orientation that the cathode is connected to the drain Dr12 of the second discharge switching element MOS12. The diode D3 is provided in such an orientation that the anode is connected to the anode of the Zener diode DZ3.

Here, the fifth wire 75, the Zener diode DZ3, and the diode D3 cooperate with the second discharge switching element MOS12 to function as a clamp circuit that clamps a drain-source voltage Vds of the second discharge switching element MOS12 so as not to exceed a predetermined upper-limit value (clamp voltage). Such a function as a clamp circuit is substantially the same as the function achieved by the Zener diode DZ2 etc. discussed above, and thus will not be further described.

With the electrically driven vehicle inverter device 12B illustrated in FIG. 7, the following effects are achieved in addition to the effects achieved by the first embodiment discussed above. That is, with the electrically driven vehicle inverter device 12B, the Zener diode DZ3 etc. functions as a clamp circuit as discussed above, and thus application of a voltage that exceeds the withstanding voltage to the second discharge switching element MOS12 can be prevented.

Here, the function as a clamp circuit achieved by the Zener diode DZ3 etc. works effectively when the abnormality detection circuit 64 functions, for example. Specifically, the abnormality detection circuit 64 forcibly turns on the transistor Tr1 when a predetermined condition is met after the start of discharge as discussed above. At this time, the potential on the positive electrode side of the smoothing capacitor C is occasionally still higher than the withstanding voltage of the second discharge switching element MOS12. In this case, when the transistor Tr1 is turned on, the second discharge switching element MOS12 is turned off with the first discharge switching element MOS11 turned on. In this event, the clamp circuit including the Zener diode DZ3 etc. functions. Consequently, the drain-source voltage Vds11 of the second discharge switching element MOS12 does not exceed the clamp voltage Vds_clamp even in the case where the second discharge switching element MOS12 is turned off with the first discharge switching element MOS11 turned on. In this way, with the second embodiment, the second discharge switching element MOS12 can be protected during operation of the abnormality detection circuit 64.

Although embodiments have been discussed in detail above, the present invention is not limited to specific embodiments, and a variety of modifications and changes may be made without departing from the scope of the claims. In addition, all or a plurality of the constituent elements according to the embodiments discussed earlier may be combined with each other.

For example, a varistor may be used in place of the Zener diodes DZ2 and DZ3 in the first and second embodiments discussed above.

In the first embodiment discussed above, a clamp circuit that restricts (clamps) the drain-source voltage Vds of the first discharge switching element MOS11 so as not to exceed a predetermined upper-limit value (clamp voltage) is provided. However, a similar clamp circuit may be provided for the second discharge switching element MOS12, rather than the first discharge switching element MOS11. In this case, a voltage from the first wire 71 is directly applied to the gate of the first discharge switching element MOS11, rather than the second discharge switching element MOS12.

In relation to the embodiments described above, the following configurations are further disclosed. The effects described below are not necessarily achieved. The effects of characteristics of dependent configurations are additional effects achieved by the characteristics.

[1]
An electrically driven vehicle inverter device (12, 12B) provided to a drive circuit for a motor that generates a drive force for a vehicle, including:
- a smoothing capacitor (C);
- a discharge resistor (R1), one end of which is electrically connected to a positive electrode side of the smoothing capacitor (C);
- a first discharge switching element (MOS11) including a gate and electrically connected to the other end of the discharge resistor (R1) in such a manner as to be electrically connected in series with the discharge resistor (R1);
- a second discharge switching element (MOS12) including a gate and electrically connected between the discharge resistor (R1) and the first discharge switching element (MOS11) and a ground;
- a control circuit (64A) that directly applies, to the gate of one of the first discharge switching element (MOS11) and the second discharge switching element (MOS12), a signal for turning on the gate;
- time difference setting means (66) for setting a time difference with which the other of the first discharge switching element and the second discharge switching element starts being turned on after the one switching element is turned on; and
- a clamp circuit (73, D2, DZ2) that is provided for the other switching element and that restricts a voltage across the other switching element so as not to exceed an upper-limit value determined in advance.

In the configuration described in [1], the first discharge switching element (MOS11) and the second discharge switching element (MOS12) are connected in series with each other. Thus, a higher voltage across the smoothing capacitor (C) can be supported. When the second discharge switching element (MOS12) is turned on earlier during discharge, the voltage across the second discharge switching element (MOS12) is lowered, along with which the voltage to be applied to the first discharge switching element (MOS11) is increased. However, the voltage to be applied across the first discharge switching element (MOS11) is restricted by the clamp circuit so as not to exceed the upper-limit value which is determined in advance. Consequently, the possibility of application of a voltage that is equal to or more than the withstanding voltage to the first discharge switching element (MOS11) can be reduced. The provision of the time difference setting means (66) eliminates the need to measure in advance the individual difference between the first discharge switching element (MOS11) and the second discharge switching element (MOS12).

[2]
The electrically driven vehicle inverter device (12, 12B) described in [1], further including:
a power source circuit (62) that generates a power source voltage at a power feed portion in the case where a discharge command is input, in which
the time difference setting means (66) includes:
- a first wire (71), one end of which is electrically connected to the power feed portion and the other end of which is electrically connected to the gate of the one switching element (MOS12, MOS11);
- a second wire (72), one end of which is electrically connected to a point on the first wire (71) between the power feed portion and the gate of the one switching element (MOS12, MOS11) and the other end of which is electrically connected to the gate of the other switching element (MOS11, MOS12);
- a first reverse flow prevention element (D1) that is provided on the second wire (72) and that hinders a flow of a current in a direction opposite to a direction toward the gate of the other switching element (MOS11, MOS12);
- a fourth wire (74), one end of which is electrically connected to a point on the second wire (72) between the first reverse flow prevention element (D1) and the gate of the other switching element (MOS11, MOS12) and the other end of which is electrically connected between the other switching element (MOS11, MOS12) and the one switching element (MOS12, MOS11); and
- a resistance element (R11) provided on the fourth wire (74).

In the configuration described in [2], when the power source voltage is raised, first, the gate of the one switching element (MOS12, MOS11) is charged via the first wire (71), and the one switching element (MOS12, MOS11) is turned on. This is because a flow of a current for charging the gate of the other switching element (MOS11, MOS12) via the second wire (72) is not generated unless the second discharge switching element MOS12 is turned on. The "time difference" can be set in this way. In [2], such a "time difference" is achieved by a circuit. In modifications, however, the "time difference" may be achieved using software.

[3]
The electrically driven vehicle inverter device described in [2], in which
the power source circuit generates the power source voltage at the power feed portion on the basis of a voltage of the smoothing capacitor.

[4]
The electrically driven vehicle inverter device (12, 12B) described in [2] or [3], in which
the clamp circuit includes:
- a third wire (73), one end of which is electrically connected to a point on the second wire (72) between the first reverse flow prevention element (D1) and the gate of the other switching element (MOS11, MOS12) and the other end of which is electrically connected between the other switching element (MOS11, MOS12) and the discharge resistor (R1);
- a second reverse flow prevention element (D2) that is provided on the third wire (73) and that hinders a flow of a current in a direction opposite to a direction toward the gate of the other switching element (MOS11, MOS12); and
- a first constant voltage generation element (DZ2) that is provided on the third wire (73) and that causes a constant voltage drop when a voltage across the first constant voltage generation element (DZ2) exceeds a value determined in advance.

In the configuration described in [4], the power source circuit (62) generates the power source voltage at the power feed portion in the case where a discharge command is input. Consequently, the gate of the one switching element (MOS12, MOS11) is charged via the first wire (71), and the one switching element (MOS12, MOS11) is turned on. When the one switching element (MOS12, MOS11) is turned on, the voltage across the one switching element (MOS12, MOS11) is lowered, along with which the voltage to be applied to the other switching element (MOS11, MOS12) is increased. However, the voltage to be applied to the other switching element (MOS11, MOS12) is restricted by the first constant voltage generation element (DZ2) so as to be lower than the voltage across the smoothing capacitor (C). Consequently, the possibility of application of a voltage that is equal to or more than the withstanding voltage to the other switching element (MOS11, MOS12) can be reduced. When the one switching element (MOS12, MOS11) is turned on, a flow of a current from the power feed portion via the second wire (72) and the fourth wire (74) is generated, and the gate of the other switching element (MOS11, MOS12) starts being charged. In this way, the one switching element (MOS12, MOS11) and the other switching element (MOS11, MOS12) are finally turned on, and discharge of the smoothing capacitor (C) progresses.

[5]

The electrically driven vehicle inverter device (12, 12B) described in [2], in which the first constant voltage generation element (DZ2) includes a Zener diode.

With the configuration described in [5], the possibility of application of a voltage that is equal to or more than the withstanding voltage to the other switching element (MOS11, MOS12) can be reduced by use of the Zener diode.

[6]

The electrically driven vehicle inverter device (12, 12B) described in [2], further including:
a fifth wire (75), one end of which is electrically connected to a point on the first wire (71) between the one end of the second wire (72) and the gate of the one switching element (MOS12, MOS11) and the other end of which is electrically connected between the other end of the fourth wire (74) and the other switching element (MOS11, MOS12);
a third reverse flow prevention element that is provided on the fifth wire (75) and that hinders a flow of a current in a direction opposite to a direction toward the gate of the one switching element (MOS12, MOS11); and
a second constant voltage generation element (DZ3) that is provided on the fifth wire (75) and that causes a constant voltage drop when a voltage across the second constant voltage generation element (DZ3) exceeds a value determined in advance.

With the configuration described in [6], the possibility of application of a voltage that is equal to or more than the withstanding voltage to the one switching element (MOS12, MOS11) can be reduced.

[7]

The electrically driven vehicle inverter device (12, 12B) described in [4], in which
the second constant voltage generation element (DZ3) includes a Zener diode.

With the configuration described in [5], the possibility of application of a voltage that is equal to or more than the withstanding voltage to the one switching element (MOS12, MOS11) can be reduced by use of the Zener diode.

[8]

The electrically driven vehicle inverter device (12, 12B) described in any one of [2] to [5], further including:
an abnormality detection circuit that electrically connects a point on the first wire (71) between the power feed portion and the gate of the one switching element (MOS12, MOS11) to the ground in the case where an elapsed time since input of the discharge command exceeds a predetermined time.

With the configuration described in [8], discharge can be suspended by turning off the one switching element (MOS12, MOS11) in the case where the elapsed time since input of the discharge command exceeds the predetermined time. Such suspension of discharge is started by turning off the one switching element (MOS12, MOS11) with the other switching element (MOS11, MOS12) turned on. At this time, with the configuration described in [4] or [5] above, the possibility of application of a voltage that is equal to or more than the withstanding voltage to the one switching element (MOS12, MOS11) during such suspension of discharge can be reduced.

[9]

The electrically driven vehicle inverter device (12, 12B) according to any one of [2] to [6], in which
the power source circuit (62) includes:
a high-potential switching element and a low-potential switching element provided between the positive electrode side of the smoothing capacitor (C) and the ground in parallel with the smoothing capacitor (C), the high-potential and low-potential switching elements being electrically connected in series with each other; and
a voltage dividing circuit that applies, to a gate of the high-potential switching element, a voltage obtained by dividing a difference between a voltage on the positive electrode side of the smoothing capacitor (C) and a voltage applied to the low-potential switching element.

With the configuration described in [9], a rise in the voltage across the smoothing capacitor (C) can be supported without raising the individual withstanding voltages of the high-potential switching element and the low-potential switching element compared to the case where a single switching element is used.

The present international application claims priority to Japanese Patent Application No. 2015-185689 filed Sep. 18, 2015, the entire contents of which are incorporated herein by reference. Although specific embodiments have been described above, one of ordinary skill in the art would appreciate that the invention is not so limited to the exemplary embodiments and various aspects of the inventions discussed above can be combined to achieve the above disclosed benefits.

DESCRIPTION OF THE REFERENCE NUMERALS

1 ELECTRICALLY DRIVEN VEHICLE MOTOR DRIVE SYSTEM
12, 12B ELECTRICALLY DRIVEN VEHICLE INVERTER DEVICE
20 DISCHARGE CIRCUIT
30 INVERTER
40 TRAVEL MOTOR
62 POWER SOURCE CIRCUIT
66 DISCHARGE CONTROL CIRCUIT (TIME DIFFERENCE SETTING MEANS)
71 FIRST WIRE
72 SECOND WIRE
73 THIRD WIRE
74 FOURTH WIRE
75 FIFTH WIRE

The invention claimed is:
1. An electrically driven vehicle inverter device provided to a drive circuit for a motor that generates a drive force for a vehicle, comprising:
a smoothing capacitor;
a discharge resistor, one end of which is electrically connected to a positive electrode side of the smoothing capacitor;
a first discharge switching element including a gate and electrically connected to an other end of the discharge resistor in such a manner as to be electrically connected in series with the discharge resistor;

a second discharge switching element including a gate and electrically connected between the discharge resistor and the first discharge switching element and a ground;

a control circuit that directly applies, to the gate of one of the first discharge switching element and the second discharge switching element, a signal for turning on the gate;

time difference setting circuit configured to set a time difference with which the other of the first discharge switching element and the second discharge switching element starts being turned on after the one of the first discharge switching element and the second discharge switching element is turned on; and a clamp circuit that is provided for the other switching element and that restricts a voltage across the other switching element so as not to exceed an upper-limit value determined in advance.

2. The electrically driven vehicle inverter device according to claim 1, further comprising:

a power source circuit that generates a power source voltage at a power feed portion in a case where a discharge command is input, wherein the time difference setting circuit includes:

a first wire, one end of which is electrically connected to the power feed portion and the other end of which is electrically connected to the gate of the one switching element;

a second wire, one end of which is electrically connected to a point on the first wire between the power feed portion and the gate of the one switching element and the other end of which is electrically connected to the gate of the other switching element;

a first reverse flow prevention element that is provided on the second wire and that hinders a flow of a current in a direction opposite to a direction toward the gate of the other switching element;

a fourth wire, one end of which is electrically connected to a point on the second wire between the first reverse flow prevention element and the gate of the other switching element and the other end of which is electrically connected between the other switching element and the one switching element; and a resistance element provided on the fourth wire.

3. The electrically driven vehicle inverter device according to claim 2, wherein the power source circuit generates the power source voltage at the power feed portion on the basis of a voltage of the smoothing capacitor.

4. The electrically driven vehicle inverter device according to claim 3, wherein the clamp circuit includes:

a third wire, one end of which is electrically connected to a point on the second wire between the first reverse flow prevention element and the gate of the other switching element and the other end of which is electrically connected between the other switching element and the discharge resistor;

a second reverse flow prevention element that is provided on the third wire and that hinders a flow of a current in a direction opposite to a direction toward the gate of the other switching element; and a first constant voltage generation element that is provided on the third wire and that causes a constant voltage drop when a voltage across the first constant voltage generation element exceeds a value determined in advance.

5. The electrically driven vehicle inverter device according to claim 4, wherein the first constant voltage generation element includes a Zener diode.

6. The electrically driven vehicle inverter device according to claim 4, further comprising:

a fifth wire, one end of which is electrically connected to a point on the first wire between the one end of the second wire and the gate of the one switching element and the other end of which is electrically connected between the other end of the fourth wire and the one switching element;

a third reverse flow prevention element that is provided on the fifth wire and that hinders a flow of a current in a direction opposite to a direction toward the gate of the one switching element; and a second constant voltage generation element that is provided on the fifth wire and that causes a constant voltage drop when a voltage across the second constant voltage generation element exceeds a value determined in advance.

7. The electrically driven vehicle inverter device according to claim 6, wherein the second constant voltage generation element includes a Zener diode.

8. The electrically driven vehicle inverter device according to claim 5, further comprising:

an abnormality detection circuit that electrically connects a point on the first wire between the power feed portion and the gate of the one switching element to the ground in the case where an elapsed time since input of the discharge command exceeds a predetermined time.

9. The electrically driven vehicle inverter device according to claim 8, wherein the power source circuit includes:

a high-potential switching element and a low-potential switching element provided between the positive electrode side of the smoothing capacitor and the ground in parallel with the smoothing capacitor, the high-potential and low-potential switching elements being connected in series with each other; and a voltage dividing circuit that applies, to a gate of the high-potential switching element, a voltage obtained by dividing a difference between a voltage on the positive electrode side of the smoothing capacitor and a voltage applied to the low-potential switching element.

10. The electrically driven vehicle inverter device according to claim 2, wherein the clamp circuit includes:

a third wire, one end of which is electrically connected to a point on the second wire between the first reverse flow prevention element and the gate of the other switching element and the other end of which is electrically connected between the other switching element and the discharge resistor;

a second reverse flow prevention element that is provided on the third wire and that hinders a flow of a current in a direction opposite to a direction toward the gate of the other switching element; and a first constant voltage generation element that is provided on the third wire and that causes a constant voltage drop when a voltage across the first constant voltage generation element exceeds a value determined in advance.

11. The electrically driven vehicle inverter device according to claim 10, wherein the first constant voltage generation element includes a Zener diode.

12. The electrically driven vehicle inverter device according to claim 10, further comprising:
a fifth wire, one end of which is electrically connected to a point on the first wire between the one end of the second wire and the gate of the one switching element and the other end of which is electrically connected between the other end of the fourth wire and the one switching element;
a third reverse flow prevention element that is provided on the fifth wire and that hinders a flow of a current in a direction opposite to a direction toward the gate of the one switching element; and
a second constant voltage generation element that is provided on the fifth wire and that causes a constant voltage drop when a voltage across the second constant voltage generation element exceeds a value determined in advance.

13. The electrically driven vehicle inverter device according to claim 12, wherein
the second constant voltage generation element includes a Zener diode.

14. The electrically driven vehicle inverter device according to claim 7, further comprising:
an abnormality detection circuit that electrically connects a point on the first wire between the power feed portion and the gate of the one switching element to the ground in the case where an elapsed time since input of the discharge command exceeds a predetermined time.

15. The electrically driven vehicle inverter device according to claim 14, wherein
the power source circuit includes:
a high-potential switching element and a low-potential switching element provided between the positive electrode side of the smoothing capacitor and the ground in parallel with the smoothing capacitor, the high-potential and low-potential switching elements being connected in series with each other; and
a voltage dividing circuit that applies, to a gate of the high-potential switching element, a voltage obtained by dividing a difference between a voltage on the positive electrode side of the smoothing capacitor and a voltage applied to the low-potential switching element.

16. The electrically driven vehicle inverter device according to claim 11, further comprising:
an abnormality detection circuit that electrically connects a point on the first wire between the power feed portion and the gate of the one switching element to the ground in the case where an elapsed time since input of the discharge command exceeds a predetermined time.

17. The electrically driven vehicle inverter device according to claim 16, wherein
the power source circuit includes:
a high-potential switching element and a low-potential switching element provided between the positive electrode side of the smoothing capacitor and the ground in parallel with the smoothing capacitor, the high-potential and low-potential switching elements being connected in series with each other; and
a voltage dividing circuit that applies, to a gate of the high-potential switching element, a voltage obtained by dividing a difference between a voltage on the positive electrode side of the smoothing capacitor and a voltage applied to the low-potential switching element.

18. The electrically driven vehicle inverter device according to claim 13, further comprising:
an abnormality detection circuit that electrically connects a point on the first wire between the power feed portion and the gate of the one switching element to the ground in the case where an elapsed time since input of the discharge command exceeds a predetermined time.

19. The electrically driven vehicle inverter device according to claim 10, further comprising:
an abnormality detection circuit that electrically connects a point on the first wire between the power feed portion and the gate of the one switching element to the ground in the case where an elapsed time since input of the discharge command exceeds a predetermined time.

20. The electrically driven vehicle inverter device according to claim 2, wherein
the power source circuit includes:
a high-potential switching element and a low-potential switching element provided between the positive electrode side of the smoothing capacitor and the ground in parallel with the smoothing capacitor, the high-potential and low-potential switching elements being connected in series with each other; and
a voltage dividing circuit that applies, to a gate of the high-potential switching element, a voltage obtained by dividing a difference between a voltage on the positive electrode side of the smoothing capacitor and a voltage applied to the low-potential switching element.

* * * * *